United States Patent
Nagl et al.

(10) Patent No.: US 6,330,828 B1
(45) Date of Patent: Dec. 18, 2001

(54) METHOD AND APPARATUS FOR SUBJECTING A DEVICE TO ROTATIONAL VIBRATION

(75) Inventors: Alan Thomas Nagl; John Jay Freeman, both of Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/547,064

(22) Filed: Apr. 11, 2000

Related U.S. Application Data

(60) Provisional application No. 60/130,284, filed on Apr. 21, 1999.

(51) Int. Cl.[7] .................................................... B06B 3/00
(52) U.S. Cl. ............................................. 73/668; 73/662
(58) Field of Search ............................. 73/662, 663, 664, 73/668

(56) References Cited

U.S. PATENT DOCUMENTS

| | | | |
|---|---|---|---|
| 2,827,780 | 3/1958 | Mahler | 66/40 |
| 3,027,747 | 4/1962 | York et al. | 73/1 |
| 3,372,572 | 3/1968 | Campbell et al. | 73/1 |
| 3,487,638 | 1/1970 | Isley et al. | 73/1 |
| 3,763,698 | * 10/1973 | Suzuki et al. | 73/88 |
| 4,445,372 | * 5/1984 | Buzzi | 73/459 |
| 4,825,692 | 5/1989 | Rohs et al. | 73/118.1 |
| 5,644,087 | 7/1997 | Liu | 73/663 |
| 5,661,615 | * 8/1997 | Waugh et al. | 360/75 |
| 5,811,678 | * 9/1998 | Hirano | 73/461 |
| 5,948,987 | * 9/1999 | Liu | 73/663 |

FOREIGN PATENT DOCUMENTS

| | | | |
|---|---|---|---|
| 2000-009204A | * | 1/2000 | (JP) . |

* cited by examiner

*Primary Examiner*—Hezron Williams
*Assistant Examiner*—Rose M. Miller
(74) *Attorney, Agent, or Firm*—John R. Wahl; Merchant & Gould

(57) ABSTRACT

An apparatus for subjecting a disc drive to rotational vibration test profiles includes a mounting base, a disc drive mounting plate, and a rotary vibration motor assembly mounted between the mounting plate and the base in which the disc drive mounting plate may be vibrationally rotated about an axis through the base and plate. The motor assembly preferably includes a plurality of voice coil motors mounted and radially spaced about a tubular shaft supporting the disc drive mounting plate. The voice coil motors are connected and driven in series to impart the rotational vibrational profile to the disc drive mounted on the mounting plate. The method involves providing a support structure, a rotatable shaft carried by the support structure, a voice coil motor connected to the shaft for reciprocally rotating the shaft, mounting a device to be tested on the shaft, and applying a current to the voice coil motor to reciprocally rotate the shaft to vibrate the device.

18 Claims, 5 Drawing Sheets

METHOD AND APPARATUS FOR SUBJECTING A DEVICE TO ROTATIONAL VIBRATION

RELATED APPLICATIONS

This application claims the benefit of priority of U.S. Provisional Patent Application Serial No. 60/130,284 entitled "ROTATIONAL VIBRATION SHAKER FOR DISC DRIVE TESTING," filed Apr. 21, 1999.

FIELD OF THE INVENTION

This application relates to magnetic disc drives and more particularly to a method and apparatus for subjecting a magnetic disc drive or other device to rotational vibration.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment.

Radial actuators employ a voice coil motor (VCM) to position the heads with respect to the disc surfaces. The actuator VCM includes a coil mounted on the end of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the heads to move back and forth in an arcuate fashion between an inner radius and an outer radius of the discs.

Minimizing structural vibration within the disc drive is critical to maintaining proper head positioning within a track, as well as to maintaining proper disc drive integrity. It is, therefore, highly desirable to experimentally evaluate the effects structural vibrations have within a disc drive and, further, to test possible solutions for preventing and minimizing anticipated structural vibrations which could arise under normal or predetermined disc drive operating conditions and handling conditions.

Structural vibration testing of disc drives is well known. Conventionally, structural vibration testing occurs though the use of a shaker apparatus, in which the subject disc drive is secured to the shaker apparatus and shaken in a reciprocal linear motion fashion, i.e., shaken back and forth, side to side, or up and down. Linear external energy is inputted into the disc drive to simulate structural vibrations introduced into a disc drive during normal operating conditions by fastening the drive to a shaker table and vibrating or oscillating the table in accordance with a predetermined acceleration profile. A key shortcoming to the use of a conventional "linear" shaker apparatus is that the operating disc drive is sensitive to both linear and rotational energy. In fact, since the late 1980s/early 1990s when a rotational actuator, instead of a linear actuator, was introduced into disc drive unit, the rotational component of structural vibrations is the predominate energy component responsible for disrupting proper head positioning within a disc drive track. Additionally, it is known in the art that rotational vibrations have other disruptive effects on disc drive operation and integrity. However, there has been no direct means of testing drives for these rotary vibrations. Accordingly, there is a need in the disc drive art for a disc drive shaker apparatus which can produce a predominately rotational energy spectrum for subjecting disc drives to rotational accelerations. Such a device can be used in accurately and more realistically testing and characterizing disc drives function under normal and predetermined operating conditions.

SUMMARY OF THE INVENTION

Against this backdrop the present invention has been developed. The present invention is a rotational shaker test apparatus for subjecting a device to be tested to a predetermined regimen of rotary oscillatory accelerations to closely simulate accelerations that may be experienced by a device during normal and anticipated operating conditions. The rotational shaker test apparatus in accordance with the present invention preferably has a base for mounting the apparatus to a stationary surface, such as a table or floor, a rotatable shaft extending substantially normal to the plane of the base and bearing supported by a pair of spaced support plates and a set of three voice coil motors (VCMs) spaced 120 degrees apart around the shaft. The motor armatures are fastened to a flanged hub fixed to the shaft. The VCM coils, as part of the armatures, are oriented so as to each move through a maximum arc of about 60 degrees in either a clockwise or counterclockwise direction about the central axis of the shaft, thus rotating the shaft through an arc of about 120 degrees. The VCM coils are electrically connected in series so that a current through one coil is the same as through the other two coils. This results in a uniform rotational movement and torque being applied to the shaft by each VCM.

The method of vibrational testing in accordance with a preferred embodiment of the present invention includes mounting a disc drive to be tested on the mounting platform fastened to one end of the cylindrical shaft and then driving the VCMS each with a predetermined current profile corresponding to a desired acceleration profile to reciprocally rotate the shaft about its central axis in accordance with the profile.

These and various other features as well as advantages which characterize the present invention will be apparent from a reading of the following detailed description and a review of the associated drawings.

BRIEF DESCRIPTION OF THE DRAWINGS

FIGS. 3-1 and 3-2 together illustrates an exploded view of the rotational vibration shake testing apparatus of the present invention. FIG. 3-1 shows an anchoring plate, lower bearing support plate, lower bearing, motor housing, voice coil motors and the central shaft. FIG. 3-2 shows an upper bearing support plate, upper bearing, support platform, test device mounting platform assemblys and a disc drive to be tested.

DETAILED DESCRIPTION

Figure 1:
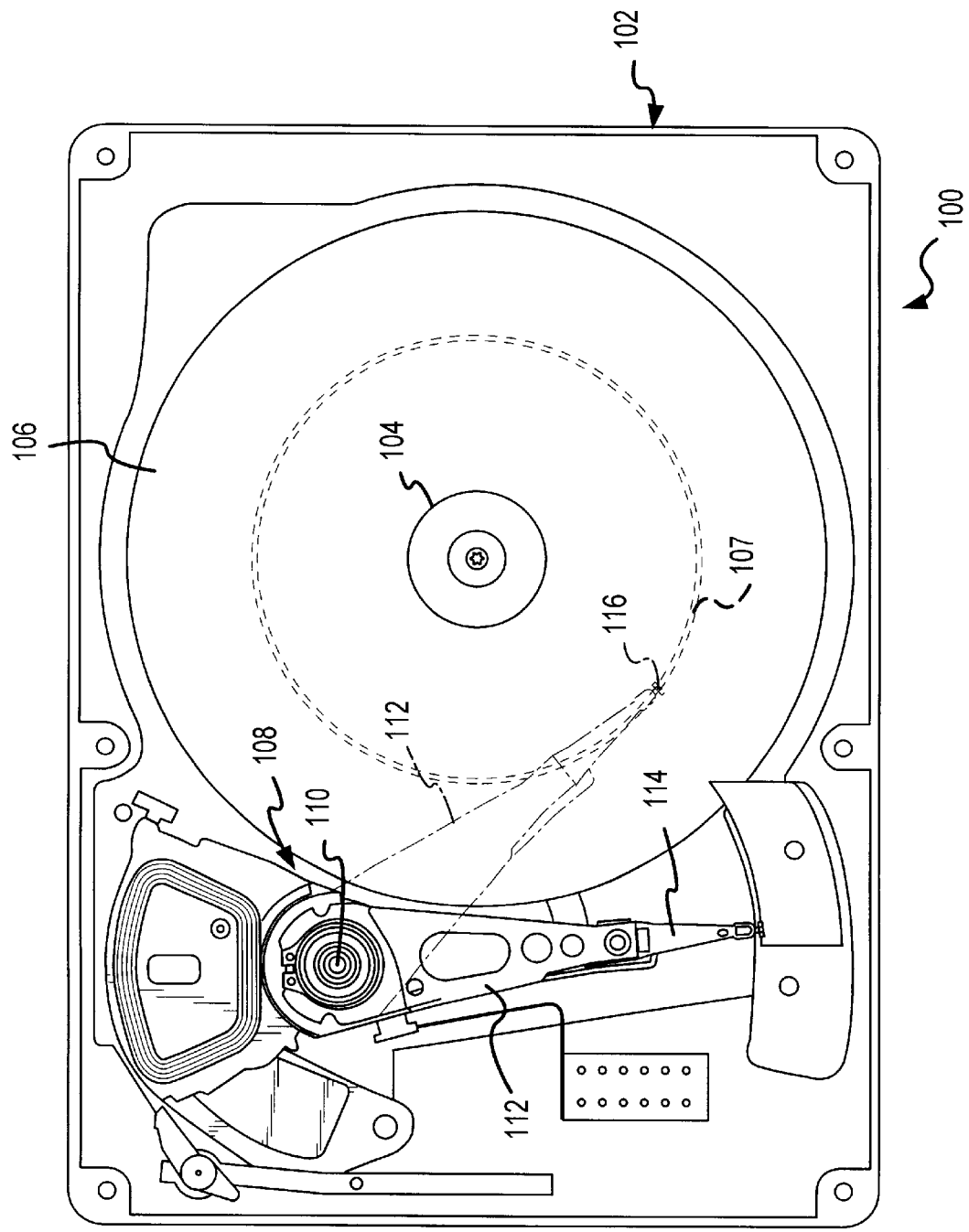
FIG. 1 is a plan view of a disc drive to be subject to rotational vibration testing in accordance with a preferred embodiment of the invention.

Critical to designing and manufacturing high quality disc drives such as the disc drive 100 shown in FIG. 1 is the ability to test and evaluate the disc drive's performance under controlled disc drive operating conditions. The present invention has been developed to more aptly simulate structural vibrations on a disc drive, and in particular, more aptly simulate real world structural vibrations that the drive may be subjected to which are predominately composed of rotational energy. A plan view of a typical disc drive 100 is shown in FIG. 1 with portions broken away to show the internal components of the disc drive. Note, other devices could be subjected to rotational energy testing with the present invention. The use of a disc drive in this specification is purely exemplary for illustrative purposes.

The disc drive 100 includes a base plate 102 to which various components of the drive 100 are typically mounted. The components include a spin motor 104 which rotates one or more information storage discs 106 at a relatively high speed. Each disc contains a surface coating of magnetic media for magnetic information storage. Information is written to and read from tracks 107 on the information storage discs 106 through the use of an actuator assembly 108, which rotates about a bearing shaft assembly 110 positioned adjacent the discs 106. The actuator assembly 108 includes a plurality of actuator arms 112 which extend towards the discs 106, with one or more flexures 114 extending from each of the actuator arms 112. Mounted at the distal end of each of the flexures 114 is a head 116 supported on an air bearing slider (not shown) enabling the head 116 to fly in close proximity above the corresponding surface of the associated disc 106 during drive operation.

Disc drives 100 are extremely sensitive to structural vibrations, and in particular to vibrations having rotational energy that travel along the same plane and arc as the path traveled by the disc drive actuator assembly 108 during head movement over a track. Conventional disc drive shaker units typically operate under principles of linear motion and are thus inefficient at testing disc drives 100 under the more relevant conditions of rotational motion. The present invention subjects disc drives to rotational vibration and is, thus, a more accurate simulator of normal disc drive operating conditions.

Figure 2:
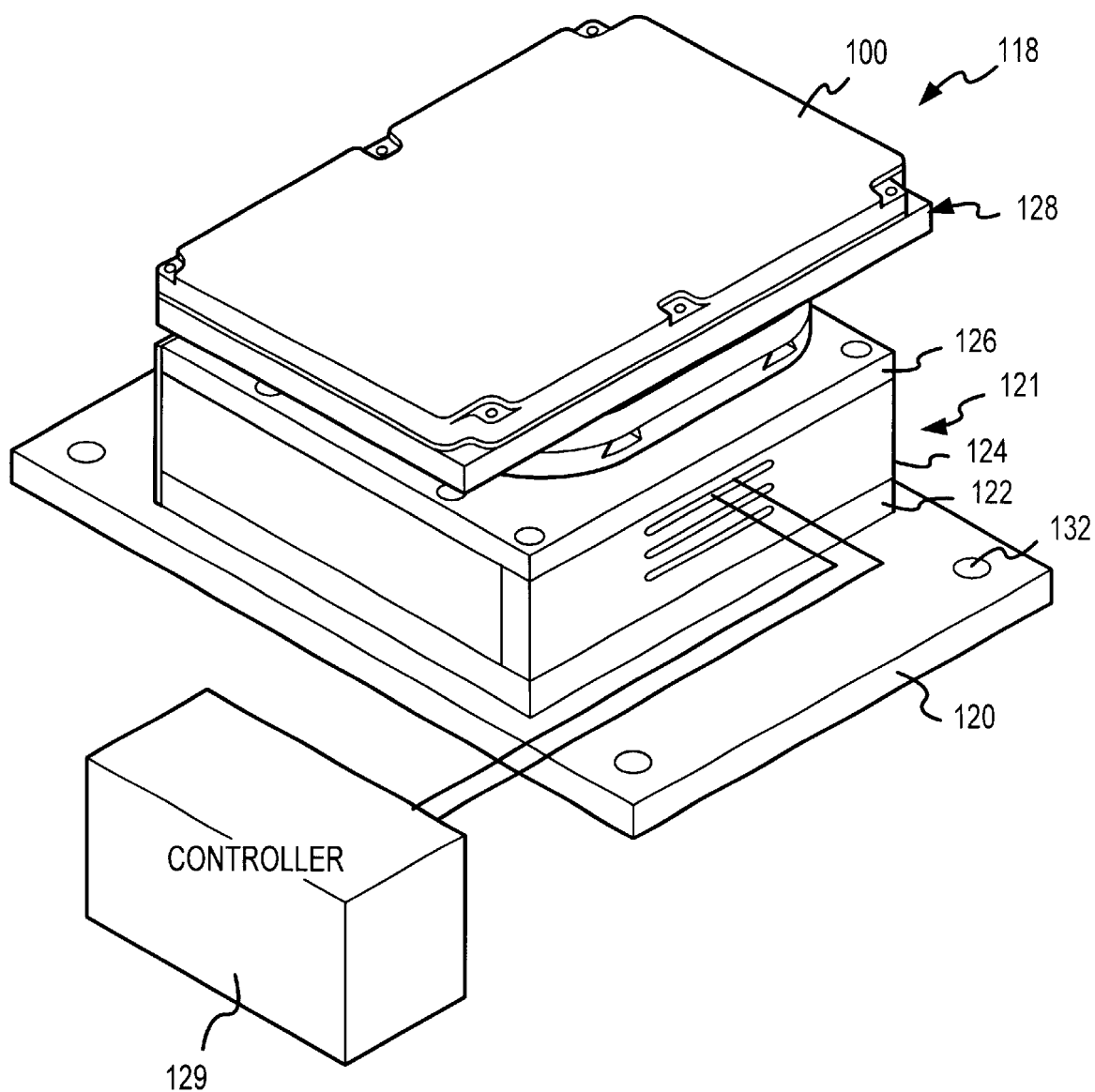
FIG. 2 illustrates a perspective view of a disc drive secured to a rotational vibration shake testing apparatus in accordance with a preferred embodiment of the present invention.

A perspective view of a preferred embodiment of the present invention is shown in FIG. 2. The disc drive rotational vibration shaker apparatus 118 in accordance with the present invention has a base or anchoring plate 120, a shaker motor and shaft support assembly 121 mounted on the anchoring plate 120, a servo controller 129 and a test device mounting platform assembly 128 mounted to a shaft 208 having a central axis 209 in the shaker motor and shaft support assembly 121.

The shaker motor and shaft support assembly 121 includes a lower bearing support plate 122, a motor housing 124, an upper bearing support plate 126 together forming a box which contains and supports an assembly 125 of three voice control motors (VCMS) 196 mounted in a ring configuration in the housing 124 so as to rotate a vertical shaft 208 rotatably supported by and extending through the lower and upper support plates 122 and 126. The upper end of the shaft 208 in turn supports the test device mounting platform assembly 128. A disc drive 100 is shown secured to the test device mounting platform assembly 128 in a testing position.

Figures 1, 3:
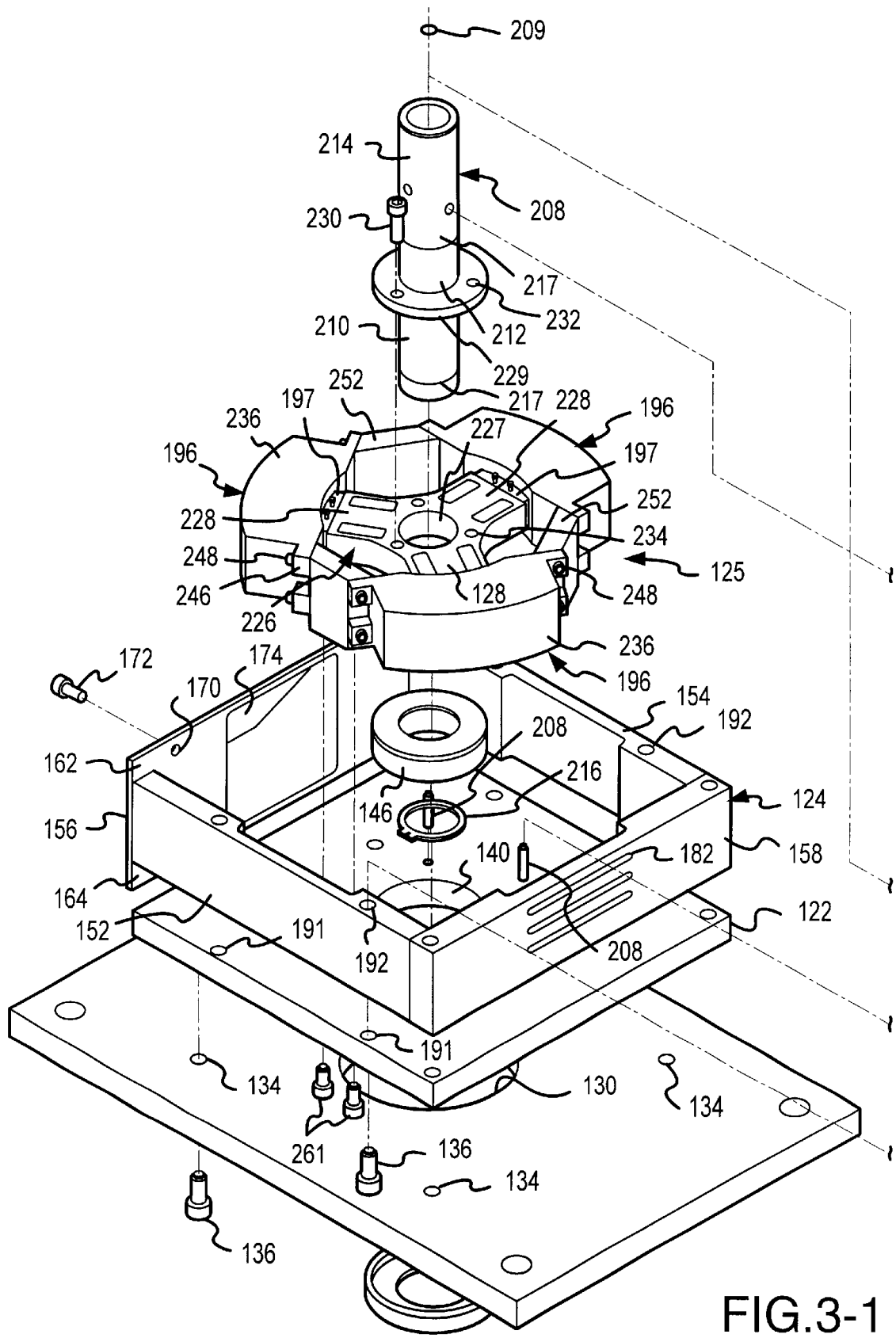
Figures 2, 3:
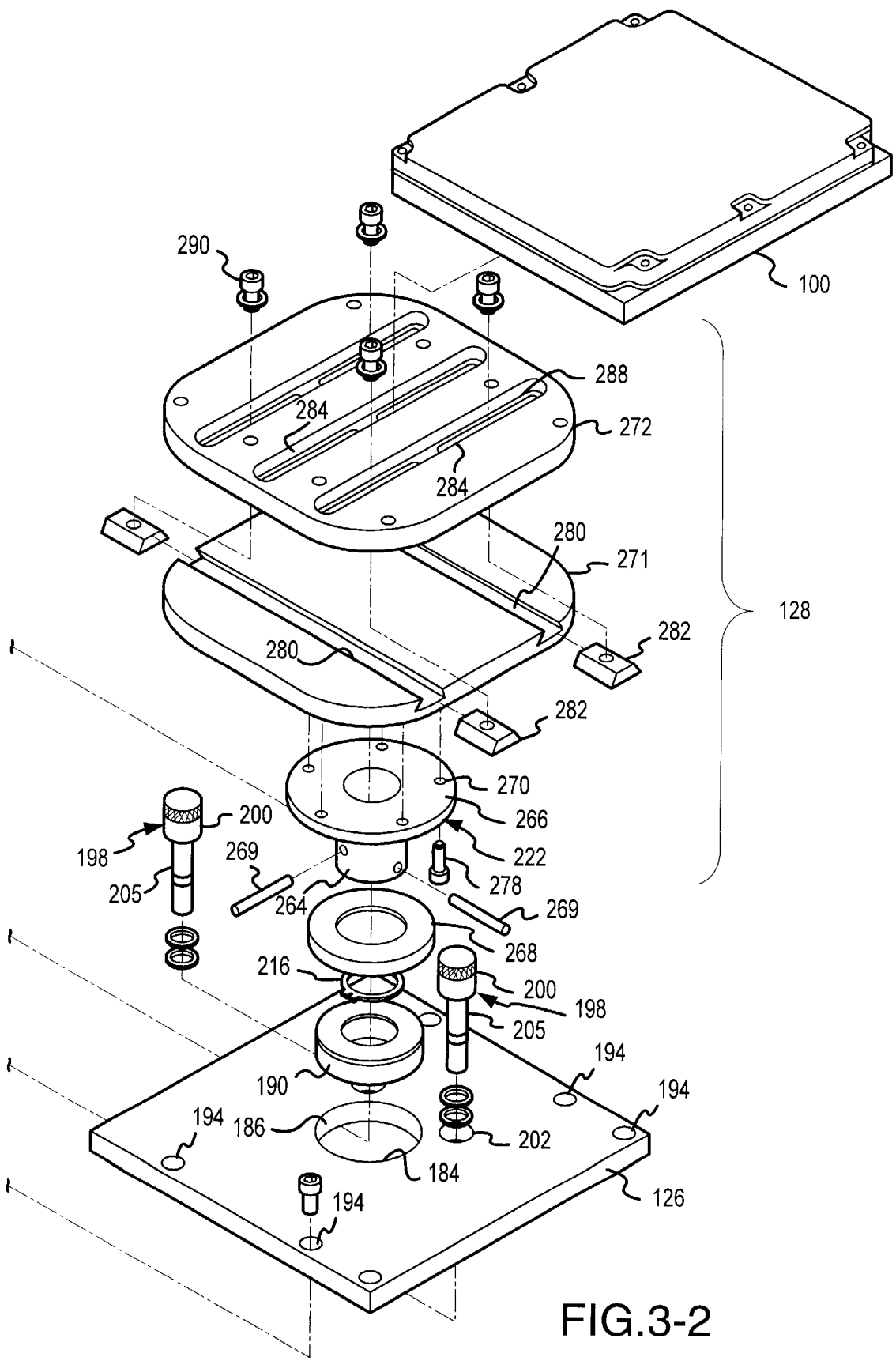

FIGS. 3-1 and 3-2 show an exploded perspective view of the shaker apparatus 118. The anchoring plate 120 which supports the rotational vibration shake testing apparatus 118 is illustrated as having a generally rectangular shape and defines a centrally located aperture 130. It is to be understood that a rectangular shape is merely exemplary, as other shapes may be more suitable for mounting the apparatus 118 to a particular surface. The preferred embodiment is typically mounted on a flat surface such as a floor or table and hence anchor plate 120 is a flat, rectangular plate. A tapped hole 132 is located at each of the four corners of the anchor plate 120 for mounting the plate to a stationary surface, e.g., table or counter top, by a threaded fastener, e.g., screw, bolt, etc. Symmetrically positioned around the central aperture 130 are four additional tapped holes 134 that each receive a threaded fastener 136 to secure the lower bearing support plate 122 to the anchoring plate 120.

The lower bearing support plate 122 preferably has a generally square plate shape and has a central aperture 140 that, when assembled, is aligned with the aperture 130 located in the anchoring plate 120. The central aperture 140 has a straight side wall forming an engagement surface for frictionally receiving and holding the outer race of a lower bearing 146 as is discussed in greater detail below.

Supported on the lower bearing support plate 122 is the shaker motor housing 124. The shaker motor housing 124 is a rectangular, tubular box structure having two vertical opposite side walls 152 and 154, a front wall 156 and a rear wall 158. The two side walls 152 and 154 and the rear wall 158 are of substantially the same height and width and are positioned along the outer periphery of the upper surface of the lower bearing support plate 122. The front wall 156 is taller than the side and rear walls and, when assembled to the side walls 152 and 154, axially extends above and below the side and rear walls 152, 154 and 158 respectively, to form a top extended front wall portion 162 and a bottom extended front wall portion 164. The top extended front wall portion 162 abuts against and is fastened to the upper bearing support plate 126 (FIGS. 2 and 3-2). Similarly, the bottom extended wall portion 164 provides an engagement surface abutting against the lower bearing support plate 122. The front wall extension portions 162 and 164 each has holes 170 for lateral attachment of the front wall 156 to the bearing plates 122 and 126 respectively with threaded fasteners 172.

The front wall 156 also has an aperture 174 for aligning with the suction side of a fan motor (not shown) to provide cooling to the VCM assembly 125 in the housing 124. The rear wall 158 has a grill of several narrow openings 182 to allow air flow to enter the motor housing 124 under the influence of the fan (not shown). Air preferably enters the motor housing 124 through the narrow openings in the rear wall 158 and cools the interior of the motor housing. The warmed air is then drawn through the housing and out through the central aperture 174 in the front wall 156 to the fan (not shown). Again, it should be noted that the exact structure of the shaker motor housing 124 is for illustrative purposes only, as other arrangements of the walls and positioning of air flow/cooling features are variations contemplated as being within the scope of the present invention.

The upper bearing support plate 126 (shown in FIG. 3-2) has a central aperture 184 that defines a tubular shaped wall 186 forming an engagement surface for frictionally receiving the outer race of an upper bearing 190 as is discussed in greater detail below. The upper bearing support plate 126 is positioned on top of the motor housing side and rear walls 152, 154 and 158 respectively and abuts against the top extended front wall portion 162. The aperture 184 is axially aligned with the aperture 140 located in the lower bearing support plate 122 and is generally aligned with the aperture 130 located in the anchor plate 120.

Through bores 191 and 194 in the lower and upper bearing support plates 122 and 126 respectively, and tapped holes 192 in the side walls of the motor housing 152 and 154 respectively are aligned, when the plates and walls are assembled, to receive threaded fasteners 136 to secure the lower bearing support plate 122, the motor housing 124 and the upper bearing plate 126 together.

The motor housing 124, lower bearing support plate 122 and upper bearing support plate 126 cooperate to form an enclosure for the ring shaped voice coil motor (VCM) assembly 125 and the shaker shaft 208. The outer race of a lower bearing 146 is press fit into the tubular wall 142 of the lower bearing support plate aperture 140. The lower bearing 146 has a freely rotatable inner race which fits onto a lower end 210 of the shaft 208. An upper bearing 190 (FIG. 3-2) has its outer race preferably press fit into the upper bearing support plate aperture 184 against the tubular side wall 186 and also has a freely rotatable inner race which slips onto the upper end of the middle portion 212 of the shaker shaft 208. The bearings 146 and 190 are preferably of a conventional roller or ball bearing type such as is typically used to support a rotating shaft.

The central shaker shaft 208 shown in FIG. 3-2, is an elongated cylindrical tube positioned within the anchor, lower bearing support and upper bearing support plate apertures 130, 140 and 184 respectively. Preferably, the central shaft 208 is hollow to reduce the inertia of the system and maximize the shaker's ability to perform reciprocating work. The central shaft includes a bottom portion 210, a flanged middle portion 212 and a top portion 214. The bottom portion 210 is preferably press fit into the inner race of the lower bearing 146. The middle portion 212 has a radially extending annular flange that is symmetrical about the axis of the shaft 208. The upper end of the middle portion 212 is preferably press fit to the inner race of the upper bearing 190 such that the flange is positioned in between the bearings. A pair of snap rings 216 fit into snap ring grooves 217 on the shaft 208 to maintain proper positioning of the bearings 146 and 190 on the central shaft 208 bottom and middle portions. The bottom portion 210 of the central shaft 208 preferably extends below the lower bearing support plate 122 into the aperture 130 defined in the anchoring plate. The top portion 214 extends well above the upper bearing support plate 126 in an axial direction normal to the planes of the bearing support plates 122 and 126. The top portion 214 extends above the bearing support plates to provide a means for attaching the test device mounting platform assembly 128.

The rotational motion of the rotational vibration shaker apparatus 118 is generated by the motor assembly 125 located within the motor housing 124 and driven via the controller 129. The motor assembly 125 includes a series of three VCMs 196 connected to a Y shaped hub 226 that has a central bore 227. The central shaft 208 fits within the central bore 227 such that the hub 226 is positioned around the middle portion of the central shaft 208. The radially extending annular flange 229 located on the middle portion 212 of the central shaft 208 abuts against the top surface of the hub 226 and is fastened to the hub via three holes 232 in the annular flange 229. These holes align with three tapped holes 234 in the hub 226. Three threaded fasteners 230 secure the flange 229 and hub 226 together.

Each of the VCMs 196 has an armature 197 that is connected to one leg 228 of the centrally positioned hub 226 which has three equally spaced legs 228. The three arms 228 of the hub 226 are spaced apart 120° so that each leg 228 of the hub 226 is equally spaced from the other legs. The hub 226 is a rigid body which may be made from metal or other rigid material and is preferably manufactured from a metal such as stainless steel or aluminum.

A presently preferred VCM is a rotary actuator made by Kimco Magnetics Division of BEI Motion Systems Company, San Marcos, Calif. This rotary actuator, VCM 196, has a vertical coil movable armature 197 disposed between permanent magnets forming adjacent magnetic fields of opposite polarity such that a current passing in one direction through the coil armature will cause the armature 197 to rotate in one direction about the axis 209 and an oppositely directed current through the armature coil to cause the armature 197 to rotate in an opposite direction. Each VCM 196 is housed in a generally rectangular shaped curved box 236. A pair of square shaped attachment lugs 246 on opposite ends of the box are used to mount the VCMs together via three motor mounting blocks 252. The mounting blocks 252 tie the three VCMs 196 together in a ring around the hub 226. There are three motor mounting blocks 252, alternating between the VCMs 196. Each attachment lug 246 has holes for receiving threaded fasteners 248 which in turn thread into the mounting block 252. More specifically, the two angled side surfaces of the trapezoidal shaped motor mount block 252 have the two tapped holes, each for receiving one of the fasteners 248 passing through one of the attachment lugs 246. In combination, the three motor mounting blocks 252 tie the three VCMs 196 together around the legs 228 of the hub 226 forming the annular motor assembly 125 with each leg 228 of the hub 226 fastened to an armature 197 of one of the VCMs 196.

The bottom of each of the motor mounting blocks 252 has two tapped holes (not shown). Corresponding aligned bores (not shown) through the lower bearing support plate receive a threaded fasteners 261 to securely fasten each motor mounting block 252 to the lower bearing support plate 122. Thus the entire VCM assembly 125 is securely fastened to the plate 122 inside of the housing 124 with the shaft 208 capable of being rotated back and forth about the shaft axis 209 through a maximum total arc of about 30 degrees about a neutral position, i.e. about 15 degrees in either direction. Other embodiments utilizing other BEI rotary actuators, may provide a different stroke in either direction up to about 30° from a neutral middle position.

Each of the VCM 196 armatures 197 includes a vertical coil (not visible, as the coil is inside the housing of the VCM 196). The armature 197 carrying the coil is attached to its adjacent hub leg 228 via threaded fasteners. The VCMs 196 are powered by a disc drive actuator servo control system represented by controller 129 and thus is not illustrated in detail. The controlled application of current by the controller 129 to the coil causes magnetic interaction between the permanent magnets and the coil so that the coil moves in accordance with the well known Lorentz relationship. Movement of the coil within the VCM 196 is translated through each of the hub legs 228 to the central shaft 208.

The three coils of the three VCMs 196 are preferably connected electrically in series to the controller 129 so that current through each VCM is substantially identical and thus the torque generated by each VCM 196 is symmetrically applied to the shaft 208. The motors thus act in a coordinated effort to rotate the central shaft 208 in accordance with a predetermined current profile generated by the user and suplied via the servo controller 129 to provide the desired vibration and/or shock accelerations. The coordinated control of the VCMs 196 potentially cause the hub 226, and hence the central shaft 208, to rotate through an arc of up to about of 60°. However, in the preferred embodiment, this motion is preferably limited to an arc of about 30°. The motor assembly 125 is preferably assembled together and then the shaft 208 is inserted through the aperture in the hub 226. The shaft 208 and hub 226 are then bolted together with three threaded fasteners 230. The assembled shaft and motors are then installed into the housing 124 and bolted to the bearing plate 122 via two threaded fasteners 261 for each mounting block 252, such that one hub leg 228 is positioned between a pair of roll pins 206.

The central shaft 208 extends upward in an axial direction above the upper bearing support plate 126 as is shown in FIGS. 2 and 3-2. Secured to the end of the top portion 214 of the central shaft 208 is a test device mounting platform assembly 128. This assembly includes a base flange member 222 which has a cylindrical sleeve portion 264 and a flat annular top flange portion 266. Mounted on the central shaft 208 between the table mount flange 222 and the upper bearing support plate 126 is a thrust ring 268 for absorbing the thrust loads generated by the rotating action of the central shaft 208. The cylindrical sleeve portion 264 telescopically slips onto and is attached to the central shaft 208 over the thrust ring 268 via roll pins 269. The flange portion 266 thus extends beyond the end of the shaft 208 such that the flange portion 266 provides a flat mounting surface and has a series of five holes 270 for attachment of the base flange 222 to the bottom plate 271 of a pair of mounting plates 271 and 272.

A pair of crash stop pins 198 operate in conjunction with a pair of roll pins 208 pressed into bores in the lower bearing plate 122, with one on either side of one leg 228. Each pin 198 has a cylindrical upper portion 200 and a lower, elongated tubular portion 205 (FIG. 3-2). The upper portion 200 of each pin fits through a tapped hole 202 in the upper bearing support plate 126. The upper portion 200 of the crash stop pin 198 is not coaxially aligned with the lower portion 205 of the crash pin 198. As such, the upper and lower portions of the crash stop pins are off center with respect to each other. However, the lower portion has a bore therein which is aligned with the upper portion 200. The two pressed pins 206 are rigidly secured in the lower bearing plate 122 and each telescopically projects upward into the bore in the lower portions 205 of the crash stop pins 198. Thus the outer surface of the lower portion 205 of the pin 198 is eccentric to the axis of the pin 198 and forms a cam surface which may be selectively positioned to interfere with the range of reciprocal rotation of the leg 228 positioned between the pins 198. They thus may be selectively positioned to further limit the rotational travel of the shaft 208. The engagement of the pins with the leg 228 provides a shock pulse simulation capability to the operation of the apparatus 118. Thus, when the crash stop pins 198 are rotated so that the lower portions 205 interfere with the full travel of the leg 228, the leg 228 will bang against the stop providing a sharp shock load to the shaft 208. This feature may be engaged or disengaged by the user by adjusting the rotational position of the upper portion 200, projecting above the upper bearing plate 126, while the apparatus 118 is fully assembled and operational.

A stacked test device mounting platform assembly 128 is mounted to the upper end portion 214 of the shaft 208. The mounting platform assembly 128 includes a X platform 271 and a Y platform 272 and the flange 222. The X platform 271 is generally square shaped plate and is securely mounted to the flat portion 266 of the table mount flange 222. Five threaded fasteners 278 through the five holes 270 located in the flat portion 266 engage threads in five tapped holes (not shown) in the bottom surface of the X platform 271 to secure the X platform to the flange 222.

The platform 271 lies in a plane transverse to the axis of the shaft 208. The upper surface of the platform 271 has two substantially parallel dove tail grooves 280 that extend the entire length of the platform 271 which define the direction of the X axis. Each groove 280 receives and slidably retains two dovetail or butterfly type nuts 282. The Y platform 272 is a generally rectangular shaped plate preferably having rounded corners as does the X platform 271, that is positioned on top of the X platform 271. A series of three substantially parallel slots 284 traverse the Y platform 272 in the Y axis direction, i.e. at a right angle to the dove tail grooves defining the X axis direction. Each slot 284 has a narrower through slot portion forming a retaining shoulder 288. The Y platform 272 is operatively attached to the X platform 271 through two pairs of threaded fasteners 290 that screw into the dovetail nuts 282 in the X platform, with one set located in each of two of the three slots 284.

When the fasteners 290 are loosely engaged with the dove tail nuts 282 the Y platform 272 is slidably engaged with the X platform 271. The Y platform 272 may be moved in the X axis direction by sliding the dove tail nuts 282 along the dove tail shaped grooves 280 found on the X platform 271. Alternatively or simultaneously, the Y platform 272 may be moved in the Y axis direction by sliding the dove tail nut bolts along the slots 284 found in the Y platform 272. Once positioned, the Y platform 272 is secured to the X platform 271, and hence to the central shaft 208, by tightening the fasteners 290 into the dove tail nuts 282. As the dove tail nut bolt 290 threads into the dove tail nut 282, the nut 282 is wedged against the sides of the dove tail shaped groove 280 and thus fixes the nut 282 within the groove 280. A drive 100 to be tested can then be fastened to the upper platform 272 for testing and the center of rotation moved to a desired position with respect to the internal components of the drive.

In use, the user first adjusts the X and Y platforms 271 and 272 relative to each other and tightens the fasteners 290 to fix the platform position relative to the axis of the shaft 208. Then a user preferably secures the target disc drive 100 to the Y platform 272 with bolts or other known fastener structures. The Y platform 272 may be positioned via the grooves 280 and slots 284 so as to optimally position a particular disc drive component in alignment with axis 209 for a particular type of rotational energy. For example, a user may wish to test the drive 100 with rotation centered below the drive center of mass, i.e., test with the purest and most centrifugally balanced type of rotation vibration. Alternatively the user may wish to off set the vibration from around its center of mass to test for destabilized types of rotational vibration. Once the X and Y stages are positioned, the dove tail nut bolts 290 are tightened in the dove tail nuts 282 to secure the stages together. The disc drive 100 may be mounted to the Y platform with threaded fasteners (not shown). Alternatively, it may be desired to test the drive with the center of vibration, i.e., axis of shaft 208 aligned with the axis of rotation of the disc drive actuator arms or the spin motor central axis. In these situations, the drive 100 will be mounted and the platforms 271 and 272 adjusted so as to center rotation of the shaft 208 directly beneath the axis of the drive motor 104 or the actuator motor 110.

A drive signal from the controller 129 is conveyed to the VCMs 196 which act in coordinated efforts to rotate the hub 226 and hence the central shaft 208. The central shaft 208 rotates with little to no bending of the shaft, and thus provides a relatively pure rotational vibrational signal to the disc drive 100.

While a rotational motor assembly 125 having three VCMs is utilized in the presently preferred embodiment of the present invention, it should be understood that in the shaker apparatus of the present invention, fewer or additional VCMs can be used to rotate the central shaft 208 of the shaker apparatus. For example, four VCMs in conjunction with a hub having four legs could be used with each motor providing a maximum movement of about 45 degrees. Additionally, other degrees of rotation may be translated by the VCMs and 30°, although preferable, is not meant to limit the scope of the present invention. Finally, the VCMs 196 can impart different frequencies and durations of rotational vibration and shock to the disc drive being tested dependent on the user's needs.

Figure 4:
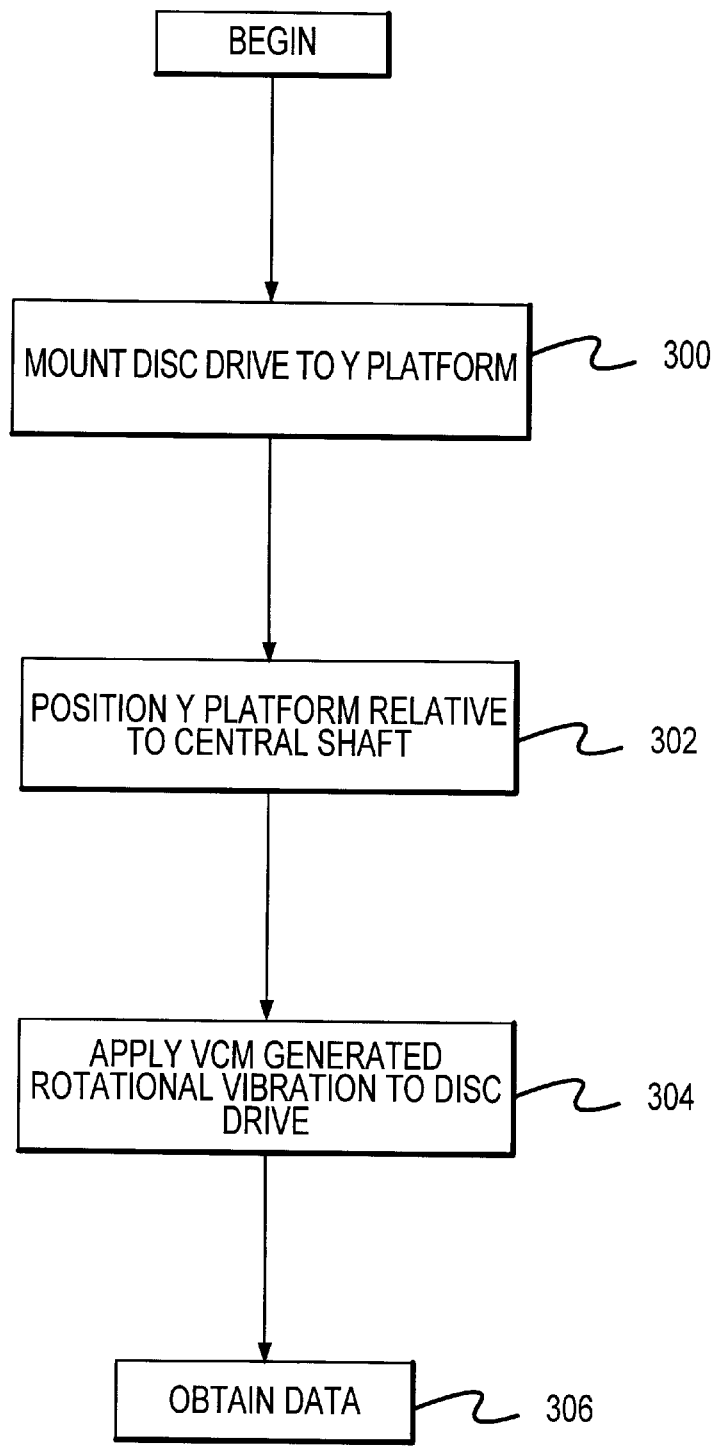
FIG. 4 is a flow chart of the method of subjecting a disc drive to rotational vibration in accordance with a preferred embodiment of the present invention.

A method for testing for the effects of rotational vibrations within a disc drive 100 in accordance with the present invention is shown in FIG. 4. First, in operation 300, the disc drive is secured to the Y platform of the disc drive rotational vibration shaker 118 with the drive 100 is centered as desired over the shaft 208. Then, in operation 302, an acceleration sensor is installed in or on the drive 100 at the location of interest. In operation 304, current is fed to the VCMs 196 in accordance with a predetermined current profile via the controller 129 to impart rotational energy to the disc drive. Control then transfers to operation 306, in which the signal from the acceleration sensor (not shown) is recorded for subsequent analysis. Control then transfers to operation 308 and the shaker apparatus 118 is de-energized and the disc drive 100 is removed from the disc drive rotational vibration shaker 118.

In summary, the present invention may be viewed as an apparatus (such as 118) for subjecting a device (such as 100) to rotational vibrations. The apparatus (such as 118) has a support structure (such as 121) operably supporting a shaft (such as 208) that has a central axis (such as 209), and a voice coil motor assembly (such as 125) fastened to the support structure. Each voice coil motor (such as 196) has an armature (such as 197) operatively connected to the shaft (such as ) for reciprocally rotating the shaft (such as 208) about its central axis (such as 209. A mounting platform (such as 272) is attached to one end of the shaft (such as 208). This platform is adapted to receive and hold a device (such as 100) to be subjected to rotational vibrations. The apparatus also has a controller (such as 129) connected to the voice coil motor assembly (such as 125) for operating the voice coil motor assembly to reciprocally rotate the shaft (such as 208) about the central axis (such as 209) to subject a device (such as 100) mounted on the platform (such as 272) to rotational vibrations.

The support structure (such as 121) includes a stationary bottom support plate member (such as 122) that supports a bearing (such as 146) rotatably supporting one end (such as 210) of the shaft (such as 208), a top support member (such as 126) connected to the bottom support member via a housing (such as 124). The top support member (such as 126) has an aperture therethrough (such as 140) which receives and supports a second bearing (such as 146) which rotatably supports the other end (such as 214) of the shaft (such as 208). The housing (such as 124 connects the top and bottom support members (such as 122 and 126) and encloses the voice coil motor (such as 196). More specifically, the voice coil motor (such as 196) is positioned between the bottom support member (such as 122) and the top support member (such as 126). The mounting platform (such as 172) is slidably attached to one of the cylindrical shaft ends (such as 214) so as to selectively position the mounting platform (such as 172) relative to the central axis (such as 209) of the cylindrical shaft (such as 208).

In particular, the preferred embodiment of the apparatus (such as 118) has three voice coil motors (such as 196) mounted equidistantly around the shaft (such as 208) in a plane transverse to the central axis (such as 209). The cylindrical shaft is preferably hollow and has an annular flange (such as 229) which is used to operatively connect the cylindrical shaft (such as 208) to the voice coil motor such as 196). This connection is facilitated by a hub (such as 226) operatively connecting the annular flange (such as 229) of the cylindrical shaft (such as 208) to the voice coil motor (such as 196).

More generally, the voice coil motor assembly may have two or more voice coil motors (such as 196) fastened to the support structure (such as 121) and operatively connected to the flange (such as 229) on the shaft (such as 208) to reciprocally rotate the shaft (such as 208) about its central axis (such as 209). The hub (such as 226) is preferably fastened to the flange (such as 229) on the shaft (such as 208) and the hub has a radially extending leg (such as 228) connected to each of the voice coil motors (such as 196).

Alternatively, the invention may be viewed as an apparatus (such as 118) for subjecting a device to rotational vibrations that has a support structure (such as 121) operably supporting a shaft (such as 208) that has a central axis (such as 209) and a voice coil motor assembly (such as) fastened to the support structure (such as 121). The voice coil motor assembly (such as) includes a plurality of voice coil motors (such as 196) connected in series, each motor having an armature (such as 250) operatively connected to the shaft (such as 208) for reciprocally rotating the shaft about its central axis (such as 209).

A mounting platform (such as 172) is attached to one end (such as 214) of the shaft (such as 208). This platform (such as 172) is adapted to receive and hold a device (such as 100) to be subjected to rotational vibrations. A controller (such as 129) is connected to the voice coil motor assembly (such as) for providing a current to the voice coil motor assembly to reciprocally rotate the shaft (such as 208) to subject a device (such as 100) mounted on the platform (such as 172) to rotational vibrations.

The voice coil motor assembly (such as) has three voice coil motors (such as 196) spaced about the shaft (such as 208) in an annular configuration. The shaft (such as 208) has an annular central flange (such as 229) that is connected to each of the armatures (such as 250) of the voice coil motors (such as 196). The apparatus (such as 118) also has a hub (such as 226) having three legs (such as 228) and a central aperture (such as 227) receiving the shaft (such as 208). Each of the legs (228) is attached to one of the armatures (such as 250) of one of the voice coil motors (such as 196). The hub (such as 226) is fastened to the central flange (such as 229) on the shaft (such as 208). Rotation of the shaft (such as 208) is limited by a pair of crash pins (such as 198) which are attached to the support structure (such as 122) with one pin (such as 198) on either side of one of the legs (such as 228) of the hub (such as 226).

The invention may also be viewed as a method for rotationally vibrationally testing a disc drive (such as 100) involving the steps of:

(a). providing a stationary support structure (such as 121), a voice coil motor (such as 196) operably coupled to a shaft (such as 208) rotatably supported by the support structure (such as 121), and a disc drive support platform (such as 172) fastened to the shaft (such as 208) for supporting a disc drive (such as 100);

(b). mounting a disc drive (such as 100) to the platform member (such as 172); and (c). applying a current to the voice coil motor (such as 198) to rotate the shaft (such as 208) to vibrate the disc drive mounted to the platform member. The current applied may be a predetermined current profile.

Thus it will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, one or more VCMs 226 may be used. The platform assembly 128 may be other than as shown. For example, the plates may permit polar permutations to be made instead or in addition to linear translations, or a predetermined set of positions may be provided, thus eliminating the adjustable features illustrated herein. The rotational angles may be varied as discussed previously, and the power of the VCMs may be changed, as well as other modifications made to the apparatus 118. Accordingly all such modifications, changes and alternatives are intended to be encompassed within the spirit of the invention disclosed and as defined by the following claims.

What is claimed is:

1. An apparatus for subjecting a device to rotational vibrations, the apparatus comprising:

a support structure operably supporting a shaft having a central axis;

a voice coil motor assembly fastened to the support structure and having an armature operatively connected to the shaft for reciprocally rotating the shaft about its central axis;

a mounting platform attached to one end of the shaft adapted to receive and hold a device to be subjected to rotational vibrations; and a controller connected to the voice coil motor assembly for operating the voice coil motor assembly to reciprocally rotate the shaft about the central axis thereby subjecting a device mounted on the platform to rotational vibrations.

2. The apparatus according to claim 1 wherein the support structure comprises:

a stationary bottom support plate member supporting a bearing rotatably supporting one end of the shaft;

a top support member connected to the bottom support member, the top support member having an aperture therethrough receiving and supporting a second bearing rotatably supporting another end of the shaft; and a housing connected to the top and bottom support members enclosing the voice coil motor.

3. The apparatus of claim 2, wherein the voice coil motor is between the bottom support member and the top support member.

4. The apparatus of claim 1, wherein the mounting platform is slidably attached to one of the cylindrical shaft ends to selectively position the mounting member relative to the central axis of the cylindrical shaft.

5. The apparatus of claim 1, further comprising three voice coil motors mounted equidistantly around the shaft in a plane transverse to the central axis.

6. The apparatus of claim 1, wherein the cylindrical shaft is hollow.

7. The apparatus of claim 6, wherein the cylindrical shaft has an annular flange around the shaft operatively connecting the cylindrical shaft to the voice coil motor.

8. The apparatus of claim 7, further comprising a hub operatively connecting the annular flange of the cylindrical shaft to the voice coil motor.

9. The apparatus of claim 7, further comprising two or more voice coil motors fastened to the support structure and operatively connected to the flange on the shaft for reciprocal rotation of the shaft about its central axis.

10. The apparatus of claim 9, further comprising a hub fastened to the flange on the shaft, the hub having a radially extending leg connected to each of the voice coil motors.

11. The apparatus according to claim 1 wherein the voice coil motor assembly includes a plurality of voice coil motors connected in series, each motor having an armature operatively connected to the shaft for reciprocally rotating the shaft about its central axis.

12. The apparatus according to claim 11 wherein the voice coil motor assembly has three voice coil motors spaced about the shaft in an annular configuration.

13. The apparatus according to claim 12 wherein the shaft has an annular central flange connected to each of the armatures of the voice coil motors.

14. The apparatus according to claim 13 further comprising a hub having three legs and a central aperture receiving the shaft, each of the legs being attached to one of the armatures of one of the voice coil motors.

15. The apparatus according to claim 14 wherein the hub is fastened to the central flange on the shaft.

16. The apparatus according to claim 14 further comprising a pair of crash pins attached to the support structure with one pin on either side of one of the legs of the hub.

17. A method for rotationally vibrationally testing a disc drive comprising the steps of:

(a). providing a stationary support structure, a voice coil motor operably coupled to a shaft rotatably supported by the support structure, a disc drive support platform fastened to the shaft for supporting a disc drive;

(b). mounting a disc drive to the platform member; and (c). applying a current to the voice coil motor to rotate the shaft to vibrate the disc drive mounted to the platform member.

18. The method according to claim 17 wherein the step (c) comprises applying a predetermined current profile to the voice coil motor.

* * * * *